United States Patent
Aamodt et al.

(10) Patent No.: US 8,332,153 B2
(45) Date of Patent: Dec. 11, 2012

(54) METHOD AND SYSTEM FOR MONITORING A DRILLING OPERATION

(75) Inventors: Agnar Aamodt, Hundhamaren (NO); Pal Skalle, Trondheim (NO); Odd Erik Gundersen, Trondheim (NO); Frode Sormo, Trondheim (NO); Jorgen Solstad, Oslo (NO)

(73) Assignee: Verdande Technology AS, Trondheim (NO)

( * ) Notice: Subject to any disclaimer, the term of this patent is extended or adjusted under 35 U.S.C. 154(b) by 0 days.

(21) Appl. No.: 13/405,547

(22) Filed: Feb. 27, 2012

(65) Prior Publication Data
US 2012/0158761 A1    Jun. 21, 2012

Related U.S. Application Data

(63) Continuation of application No. 12/404,961, filed on Mar. 16, 2009, now Pat. No. 8,170,800.

(51) Int. Cl.
*G01V 9/00* (2006.01)
(52) U.S. Cl. .......................................................... 702/9
(58) Field of Classification Search ................ 702/9, 13, 702/14, 182–185
See application file for complete search history.

(56) References Cited

U.S. PATENT DOCUMENTS

| | | |
|---|---|---|
| 4,794,534 A | 12/1988 | Millheim |
| 5,327,984 A | 7/1994 | Rasi et al. |
| 5,448,911 A | 9/1995 | Mason |
| 5,511,037 A | 4/1996 | Randall et al. |
| 5,654,503 A | 8/1997 | Rasmus |
| 5,721,376 A | 2/1998 | Pavone et al. |
| 5,730,234 A | 3/1998 | Putot |
| 5,892,361 A | 4/1999 | Meyer, Jr. et al. |
| 5,952,569 A | 9/1999 | Jervis et al. |
| 6,060,884 A | 5/2000 | Meyer, Jr. et al. |
| 6,152,246 A | 11/2000 | King et al. |
| 6,282,452 B1 | 8/2001 | DeGuzman et al. |

(Continued)

FOREIGN PATENT DOCUMENTS
EP    0336490 A1    10/1989
(Continued)

OTHER PUBLICATIONS

Aamodt, Agnar, "CBR for Advice Giving in a Data-Intensive Environment", 10th Scandinavian Conference on Artificial Intelligence, Published by IOS Press (www.iospress.nl/flyers_b/fl9781586038670.pdf). Handed out to conference attendees on May 26, 2008, submitted to editor on Mar. 28, 2008.

*Primary Examiner* — Edward Raymond
(74) *Attorney, Agent, or Firm* — Kenyon & Kenyon LLP

(57) ABSTRACT

The present invention provides a computer-implemented software tool that is adapted to listen continuously to data streams from a drilling operation and to process the data to generate a situation description for a current drilling situation in a form useful for automated continuous matching with a set of past cases stored in a knowledge database. The invention implements a case-based reasoning (CBR) approach to match the current drilling situation as defined by the situation description with one or more stored past cases having a degree of similarity above a predetermined threshold level. Matching cases are displayed to the drilling engineer as symbols on a case "radar", allowing the drilling engineer to retrieve and view the details of a past case and take appropriate action based on drilling advice provided within the past case.

15 Claims, 7 Drawing Sheets

U.S. PATENT DOCUMENTS

| | | |
|---|---|---|
| 6,400,148 B1 | 6/2002 | Meyer et al. |
| 7,142,986 B2 | 11/2006 | Moran |
| 2002/0050989 A1 | 5/2002 | Sanstrom |
| 2002/0103630 A1 | 8/2002 | Aldred et al. |
| 2004/0124009 A1 | 7/2004 | Hoteit et al. |
| 2004/0124012 A1 | 7/2004 | Dunlop et al. |
| 2004/0256152 A1 | 12/2004 | Dashevskiy et al. |
| 2006/0272812 A1* | 12/2006 | Yu et al. ............ 166/252.5 |
| 2007/0168056 A1 | 7/2007 | Shayegi et al. |
| 2008/0066959 A1 | 3/2008 | Pastusek et al. |
| 2008/0097735 A1 | 4/2008 | Ibrahim et al. |
| 2008/0179094 A1 | 7/2008 | Repin et al. |
| 2008/0253228 A1* | 10/2008 | Camwell et al. ............ 367/82 |
| 2009/0076873 A1 | 3/2009 | Johnson et al. |

FOREIGN PATENT DOCUMENTS

| | | |
|---|---|---|
| EP | 0354716 A1 | 2/1990 |
| EP | 0572055 A1 | 12/1993 |
| EP | 1632644 A2 | 3/2006 |
| EP | 1297244 B1 | 7/2009 |
| GB | 2275283 A | 8/1994 |
| GB | 2311140 A | 9/1997 |
| WO | 03/100537 A | 12/2003 |
| WO | 2008/127948 A1 | 10/2008 |

* cited by examiner

METHOD AND SYSTEM FOR MONITORING A DRILLING OPERATION

CROSS-REFERENCE TO RELATED APPLICATIONS

The present application is a continuation of and claims the benefit of co-pending U.S. application Ser. No. 12/404,961, filed Mar. 16, 2009, entitled, "A METHOD AND SYSTEM FOR MONITORING A DRILLING OPERATION". The disclosure of this application is incorporated herein by reference in its entirety.

BACKGROUND TO THE INVENTION

Many industries, including the oil and gas industry, have access to large amounts of electronic data and information, and advanced software tools for displaying various types of information. As the amount of available data increases, the need for software tools to extract, or filter out, the relevant information in a given situation increases correspondingly.

As part of their normal work, oil well drilling engineers and other operational personnel both offshore and in support centres onshore have at their disposal a large set of sophisticated sensor measurements and other drilling parameters. The bulk of this data are continuous (real time) data streams from the drilling operation. Software tools for keeping track of data from these drilling logs help the personnel to perform graphical comparisons through time-indexed or depth-indexed graphs. However, as powerful as these visualisation tools are, the drilling operation is fundamentally reliant on the experience and training of the individual drilling engineer to interpret the data and take appropriate action.

As the world's reserves of fossil fuel diminish, wells are becoming increasingly difficult and correspondingly expensive to drill, and operational mistakes have potentially more serious, not to mention extremely expensive, effects. The typical running costs for an offshore drilling platform can be up to $200,000 per day. Any loss of drilling time caused by unwanted events is undesirable.

Case-based reasoning (CBR) is an approach to problem solving and decision making where a new problem is solved by finding one or more similar previously solved problems, called cases, and re-using them in the new problem situation. It has been recognised that CBR might find a practical application in the offshore drilling industry where there is a wealth of stored information on operational drilling experience from around the world but which drilling engineers find difficult to access and use for the purpose of decision making in real time. In particular, European publication EP1297244 describes a computer implemented CBR system in which a drilling engineer manually enters data describing a current drilling situation into a database query which is used to search for and identify similar past cases stored in a database adapted for CBR. The past cases contain associated drilling data and user experience for a similar drilling situation, typically from a different drilling site, that might help the drilling engineer predict and avoid an unwanted event. The core of this system is the structuring of a knowledge database in order to represent cases as well as general relationships, so that the system can permit the user to manually enter a query in the specified database query language, and get the collection of cases that match the query items in return. The input query is entered by the user, and the retrieved cases are returned, in a structured text format. The database query language allows the user to retrieve cases that perfectly match the query given as input.

SUMMARY OF THE INVENTION

According to one aspect of the present invention, a computer-implemented method of monitoring a drilling operation comprises the steps of:
a. receiving a data stream from a drilling rig, the data stream including a plurality of real time sensor logs associated with the operation of a drill string used in the drilling operation;
b. processing the received data stream to generate a computerised situation description including data representing a current drilling situation;
c. comparing the computerised situation description with a set of past case records stored in computer memory in a knowledge database;
d. identifying one or more past case records that match the current drilling situation as defined by the situation description to a degree of similarity above a predetermined threshold level;
e. providing a visual display of matching cases identified in step (d) which allows a user to retrieve and view details of the stored past cases; and,
g. repeating steps (a) to (e) over time, thereby to update the visual display of matching cases.

According to another aspect of the present invention, a computer-implemented method for monitoring a drilling operation comprises the steps of:
a. computer processing drilling data received from a drilling rig to identify one or more past cases stored in computer memory in a database that match a current drilling situation to a degree of similarity above a predetermined threshold level; and,
b. displaying the or each matching case as a symbol on a polar plot in which the degree of similarity is represented by the radial displacement from a central point, wherein each symbol displayed on the polar plot is linked to an individual past case and can be user-selected to retrieve and display details of the past case.

According to a further aspect of the present invention, a system for monitoring a drilling operation comprises:
a data analysis server coupled to a communications network for receiving a data stream from a drilling rig, the data stream including a plurality of real time sensor logs associated with the operation of a drill string used in the drilling operation; and,
a database of past case records, each case record including data describing an historic drilling situation,
wherein the data analysis server is programmed to:
a. process the received data stream to generate a situation description including data representing a current drilling situation;
b. compare the situation description with the past case records stored in the database;
c. identify one or more past case records that match the current drilling situation as defined by the situation description to a degree of similarity above a predetermined threshold level;
d. generate a visual display of matching cases identified in step (c) which allows a user to retrieve and view details of the stored past cases; and,
e. repeat steps (a) to (d) over time, thereby to update the visual display of matching cases.

In the preferred embodiment of the present invention, we provide a software tool that is adapted to listen continuously to data streams from a drilling operation and process the data to generate a situation description for a current drilling situation in a form useful for automated continuous matching with a set of past cases stored in a knowledge database. The invention implements a case-based reasoning (CBR) approach to match the current drilling situation as defined by the situation description with one or more stored past cases having a degree of similarity above a predetermined threshold level. Matching cases are displayed to the drilling engineer as part of a graphical user interface as symbols on a case "radar", allowing the drilling engineer to retrieve and view the details of a past case and take appropriate action based on drilling advice provided within the past case.

BRIEF DESCRIPTION OF THE DRAWINGS

An example of the present invention will now be described in detail with reference to the accompanying drawings, in which.

DETAILED DESCRIPTION

Figure 1:
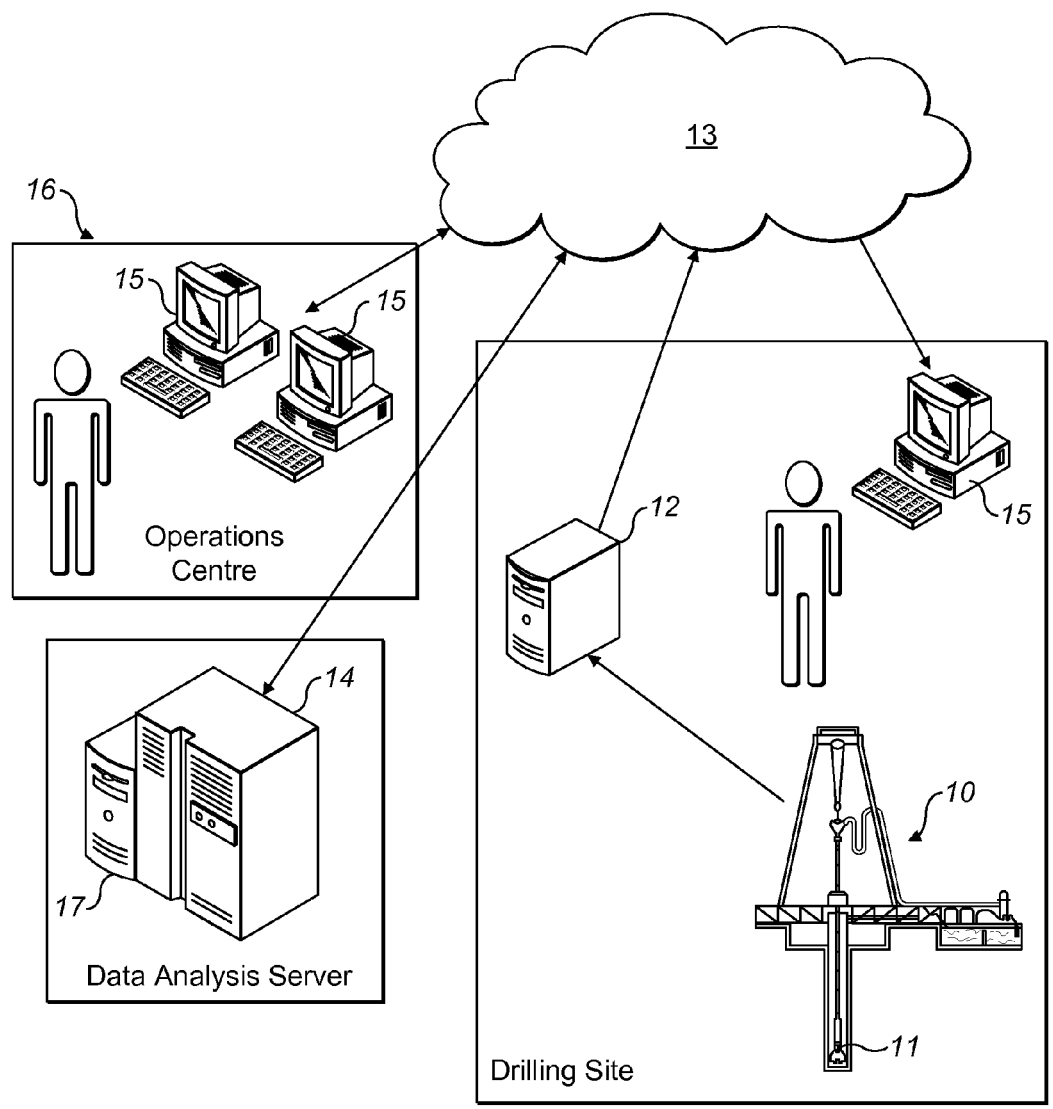
FIG. 1 is a simplified schematic of an offshore drilling site and associated communications and data processing network.

FIG. 1 is a simplified schematic of an offshore drilling site and associated communications and data processing network for monitoring a drilling operation in accordance with an embodiment of the present invention.

As shown in the Figure, sensors (not shown) located both on the drilling rig 10 and at a drill bit 11 produce data that are collected by a standard data collection service 12 also located on the drilling rig 10. The collected data is then transferred, in real-time, as one or more digital data streams over a communications network 13 to a remote data analysis server 14. The preferred transfer format and protocol is based on the industry WITSML format, which uses XML as a data format and web services over HTTPS as a protocol. The data analysis server 14 runs a software application which monitors the incoming data and performs data analysis.

Existing software visualisation tools for keeping track of data from these drilling logs help the personnel to perform graphical comparisons through time-indexed or depth-indexed graphs. However, as powerful as these visualisation tools are, the drilling operation is fundamentally reliant on the experience and training of the individual drilling engineer to interpret the data and take appropriate action.

As will be described in detail below, the data analysis server 14 in the present invention continuously forms situation descriptions and automatically matches against historic cases stored in a knowledge database 17. The knowledge database 17 is shown as a part of the data analysis server 14 in this example. Drilling engineers or other drilling operators use a client application running on a personal computer 15 or other computing device to connect from the drilling rig 10 site or an onshore operations centre 16 to the data analysis server 14 in order to receive and display the analysed data and matched cases. Once connected, the client application is continuously updated with information from the data analysis server 14 until such a time as the client is closed.

The preferred data analysis server 14 is a server program written in the Java programming language, running on a Windows or Linux operating system. The preferred client application is also a Java application, running on a Windows or Linux desktop operating system. The protocol between the client application and server application is based on regular polling by the client application using an encrypted HTTP (HTTPS) connection.

The present invention provides a system and associated software that can assist oil well personnel during drilling operations in improving the quality and efficiency of the drilling process. In a preferred embodiment, the system helps to avoid "unwanted events", i.e. events that lead to a slower drilling progression than expected. In particular, data from earlier drilling operations are gathered in a case base. The case base is linked to a model of general domain knowledge. The preferred server-based system is linked online to an ongoing drilling process, supervises the process by continuously collecting numerical and symbolic data from a large number of parameter readings, interprets these readings, retrieves one or more past cases that match the current state of the drilling process, and on that basis delivers relevant advice via a client application about how to proceed in order to avoid a possible unwanted event.

The client application extends the screen information of conventional visualisation tools to ensure better decisions. One extension is by giving explicit high-level well status information based on the interpretation of the data. This is done by identifying and displaying particular "interpreted events" attached to the data logs, as the drilling process proceeds. These events are high level interpretations that characterise the status of the well.

The data analysis server 14 in FIG. 1 also interprets numerical log data into symbolic features such as qualitative parameter values, trends, interpreted activities, interesting events, etc. for the purpose of identifying useful features for the retrieval of relevant past cases.

The data analysis server 14 attempts to find a matching case (or set of matching cases) with a degree of match above a certain threshold. On the basis of an identified past case that is sufficiently similar to the current situation, actions are suggested to the drilling operator that should be taken to avoid the predicted event.

Figure 2:
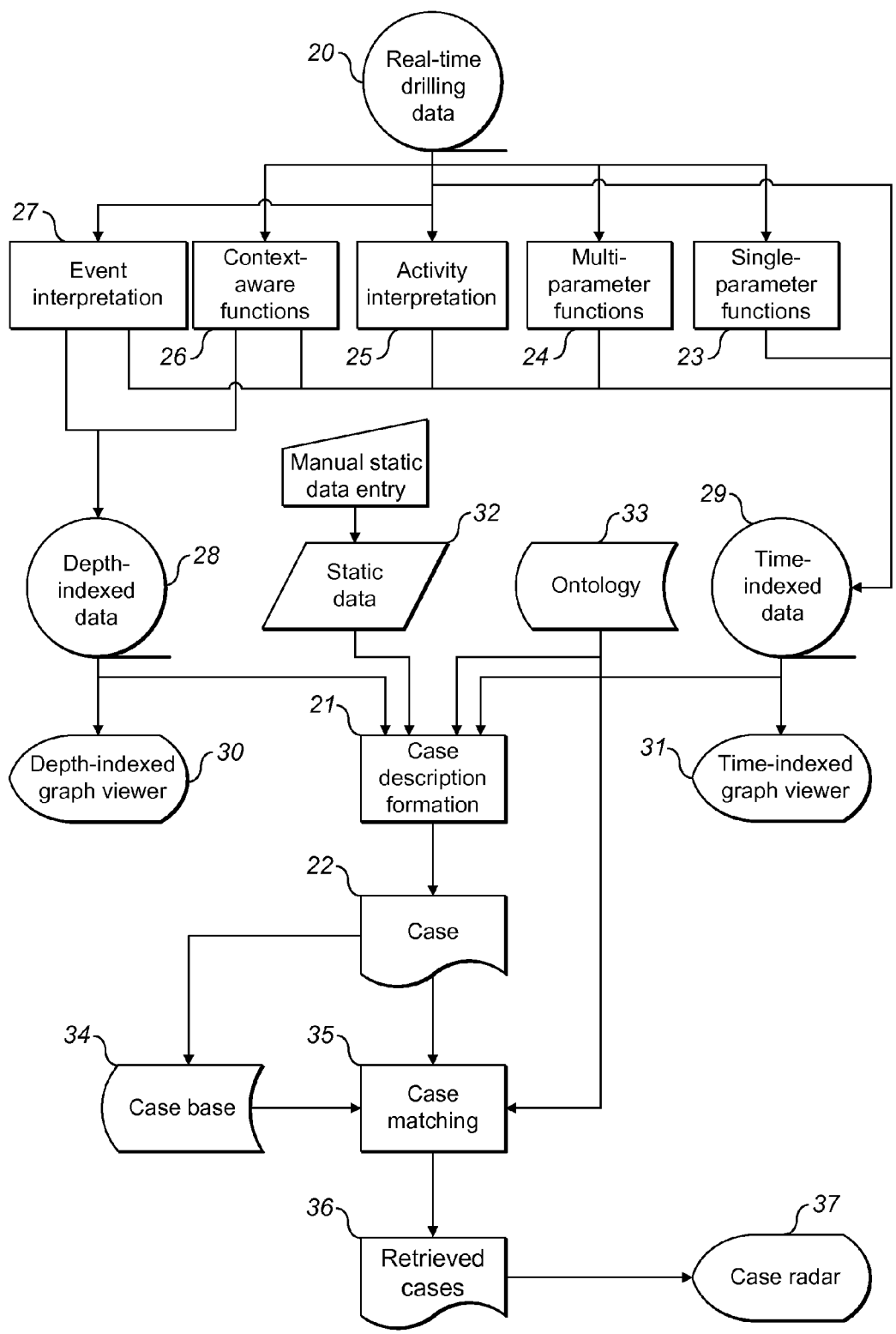
FIG. 2 is a simplified flow diagram illustrating a preferred system and method for monitoring a drilling operation.

Referring now to FIG. 2, the system receives real-time drilling data 20 provided by the monitored drilling operation. The drilling data 20 is recorded both down-hole and on the oil rig by a data service company and is typically transferred over a dedicated optical fibre network or a satellite to an onshore real-time operations centre.

The observed data provided by the monitored system is indexed on a time-based scale. Some of these observed data are regarded as good indicators of the process and are thus used in a case description formation 21 to generate an input case 22. Such observed data used in the case description formation are referred to as observed indicators, and examples include Equivalent Circulating density (ECD) and Bit Depth.

Other important observed data monitored and reported in real-time include block position, bit depth, hook load, weight on bit (WOB), flow rate, pump pressure, rate of penetration (ROP), rotations per minute (RPM) and torque. These parameters are used as input to various functions processing the observed data.

Single parameter values are not generally indicative of the state of the drilling operation, and so other types of indicators are needed in addition to the observed indicators. In order to index information based on the state of the well, it is therefore necessary to produce indicators that more directly represent the state of the well than the observed indicators are able to do. These are referred to as processed indicators, resulting from a processing, of some kind, of the observed data.

Single-parameter functions 23 monitor pattern changes of a parameter, such as rate of change over specific time periods, trends, and moving averages. Multi-parameter functions 24 combine a set of observed parameter values and can be rather complex. A simple example is the ratio between the pump pressure and mud flow. An activity interpretation function 25 interprets the current drilling activity from the observed parameters and the single-parameter 23 and multi-parameter 24 functions. Examples of activities include drilling, tripping and reaming. Context aware functions 26 take the drilling activity into account in addition to other indicators, both observed and interpreted, in order to sort out irrelevant parts of the data. An event interpretation function 27 attempts to recognise patterns of data across one or more parameters that signify an interesting event, symptom or problem, such as a pack off of the string, taking weight while tripping or a kick.

When a new set of real-time data 20 is available from the drilling operation, typically at sampling intervals of between 1 and 20 seconds, each processed indicator is invoked to produce a value. The processed indicator may use both current and previous depth-indexed and time-indexed data. The results of the processed indicators can either be stored as depth-indexed data 28, time-indexed data 29 or both. The activity interpretation function 25 does not produce a numeric value, but rather a symbolic value representing the activity going on in the well. The event interpretation function 27 is special in that it produces either no value (if no event is detected) or register an event at the current time and depth of a particular type (e.g. tight spot or pack off). Thus, the processed indicators may also depend on other processed indicators, which mean the system must ensure that the processed indicators are produced in an order that ensures that all dependants are calculated before an indicator is called. To ensure this, each processed indicator has associated a list of other indicators it depends on. This list forms a partial ordering of processed indicators that is used to decide the order of execution.

Both the depth-indexed data in 28 and the time-index data in 29 is stored in a table data structure indexed on time and depth, respectively. In these tables, there is one column per observed data and observed indicators. Whenever new data is produced, it is added to the table so that it contains all the data from the beginning of the operation. This allows the user to go back and examine past data through the graphical user interface. The depth-indexed data 28 is made available through a graphical user interface in a depth-indexed graph viewer 30 while time-indexed data 29 is made available through the time-indexed graph viewer 31. Thus, all observed parameters can be viewed in the time-indexed graph viewer 31 and processed indicators can be viewed in the depth-indexed graph viewer 30, the time-indexed graph viewer 31, or both. Activity interpretations 25 are examples of data plotted on a time-indexed graph viewer 31. Interpreted events 27 are shown in a special column on both the time-indexed graph viewer 31 and depth-indexed graph viewer 30. This means that the drilling operator directly can view and gain information from the processed indicators.

Figure 3:
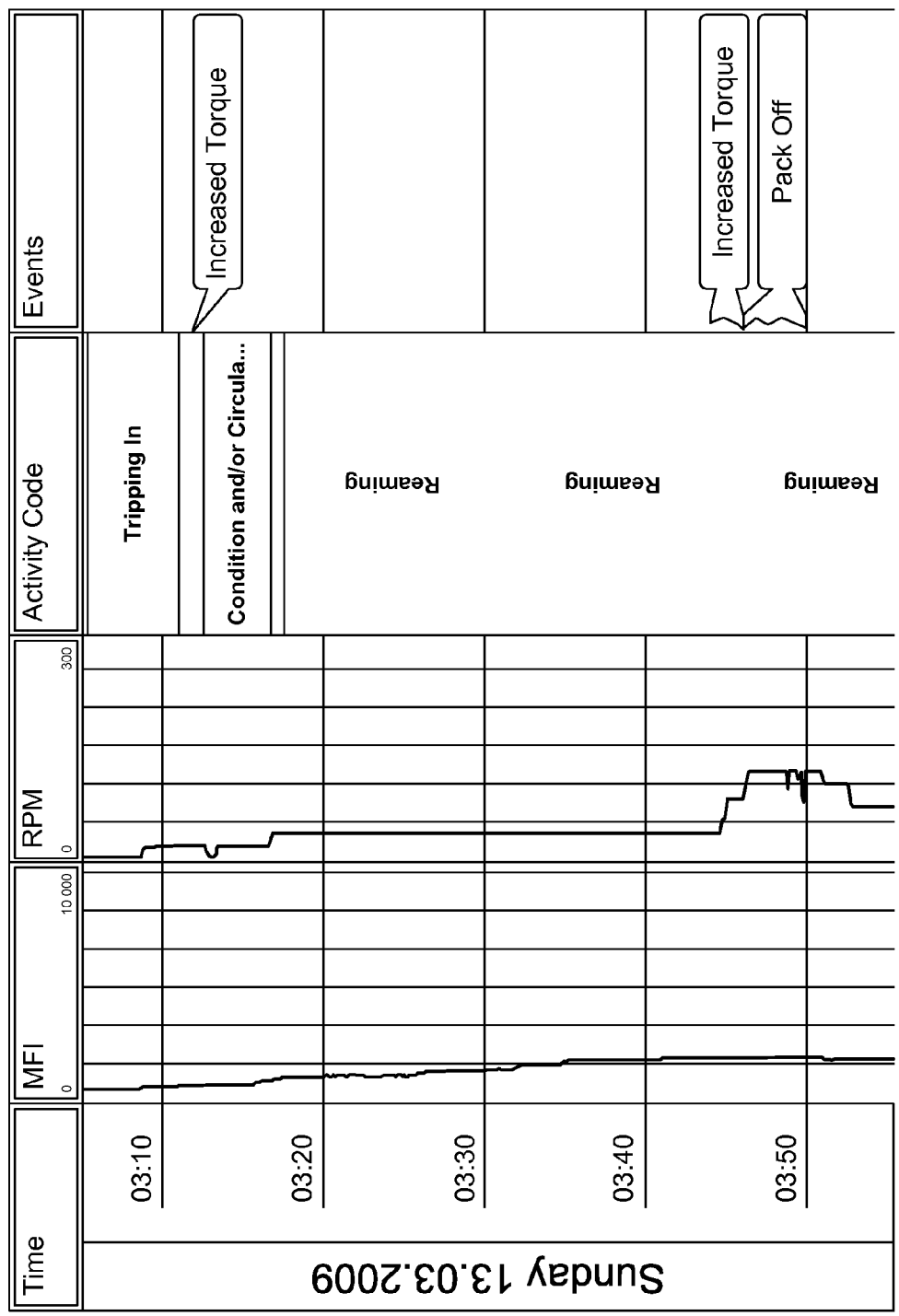
FIG. 3 shows a screenshot taken from a graphical user interface.

A simplified screenshot from a graphical user interface (GUI) for a client application illustrating the time line, two observed parameters (MFI and RPM) and two processed parameters (Activity Code and interpreted Events) is shown in FIG. 3. Processing functions may be made available through the GUI shown in FIG. 3 as if they were directly measured parameters from the operation.

In FIG. 3, time increases downwards in the time-indexed graph viewer. MFI and RPM are observed data that vary with time and are plotted in the time-based graph viewer as a single numeric value for each time step. Activity codes are plotted as symbolic values with names along the time scale, e.g. tripping in, condition and/or circulating, and reaming. Interpreted events are plotted as symbols pointing at the exact point in time where detected. To avoid visual cluttering, interpreted events of the same type are grouped together in the column. Also, interpreted events with different severity can have different colours.

Case-based reasoning (CBR) systems solve problems by reusing the solutions that solved historical problems stored in a case-base. A case stored in the case-base is comprised of a problem description and the solution solving the problem. A new case encountered by the system lacks the solution part, which is found by comparing the new case to all the historical cases stored in the case-base. The solution to, for instance, the most similar historical case is then used for solving the new problem.

The main objective of the CBR system described here is to warn about unwanted situations, more specifically problems encountered during oil drilling. In real-time, the CBR system monitors the drilling process through both observed and processed indicators and continuously captures new cases describing the current situation and compares them to the historical cases stored in the case-base.

As shown in FIG. 2, the result of the case description formation 21 is a case 22. In addition to depth-indexed data 28 and time-indexed data 29 produced by the data analysis server 14 or received as real-time drilling data 20, a case 22 contains static data 32 entered through a manual process by a drilling expert, or read from an input file, as part of the setup procedures when a new well section is about to be drilled. All symbolic data are represented in an ontology 33. The ontology 33 is a description of both generic concepts and application-specific concepts, as well as the relations between them. Thus, both the case structure and the case contents are described in the ontology.

Figure 4:
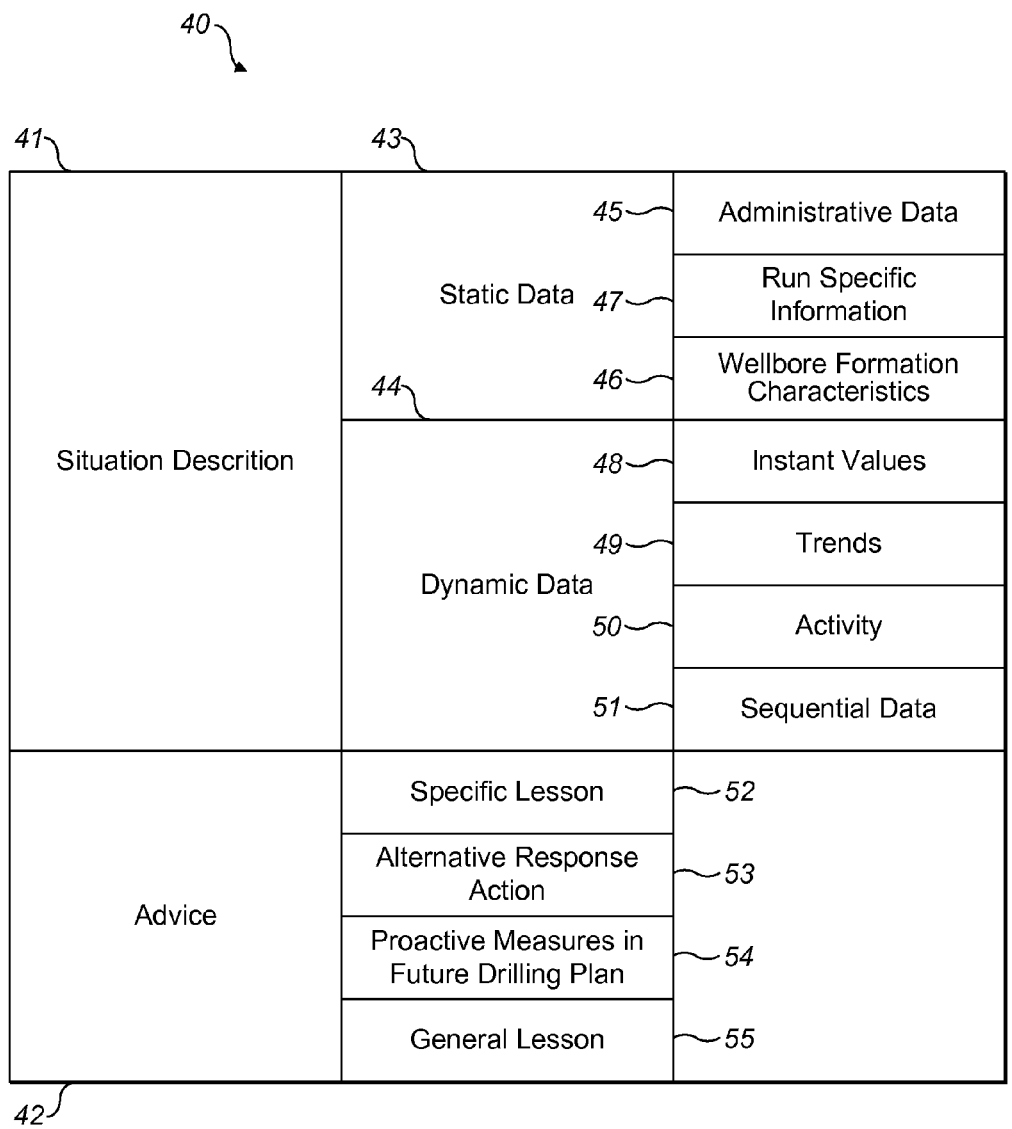
FIG. 4 shows an example of the data structure of a case description stored in a CBR database.

As shown in FIG. 4, a case 40 contains a situation description 41, which captures the state of the monitored system at a given time, in addition to an advice portion 42 which provides advice for solving the described situation. The case 40 is a rich source of knowledge as it contains structured data in the form of parameter hierarchies. The parameters comprise numerical, symbolic, and textual information. All parameters and their possible symbolic values are described in the ontology 33 (FIG. 2).

The situation description 41 contains both static data 43 and dynamic data 44. The static data 43 describes the current configuration of the system, for example administrative data 45, wellbore formation characteristics 46 and run specific information 47, while the dynamic data 44, which changes continuously over time, are represented by instant values 48, trends 49, activity codes 50 and sequential data 51. Sequential data 51 is represented along different scales. As will be described in detail below, in oil drilling, sequential data is preferably represented along both a time-based and a depth-based scale. This is because certain information can be detected at a particular depth, but be relevant when returning to the same depth. For instance, a hard stringer (a thin, hard rock formation embedded in a softer formation) can only be detected while drilling through the formation, but it is relevant information when the operator pulls the drill string up so that the drill bit goes through the depth where a hard stringer was previously identified. The information that is relevant when at the depth at a later time is indexed on the depth-scale, and the information that is only relevant around the time it happens is indexed on the time-scale.

The advice part 42 of the case 40 contains the solution to the specific situation described by the situation description part 41 of the case. Thus, a case 40 comprises a situation description 41 and advice 42 for that specific situation. The advice part 42 in an oil drilling case could contain one or more of a specific lesson 52 learned from a historical drilling situation, alternative response action 53, pro-active measures in future drilling plan 54, and general lessons 55 which may be linked to a best practice guideline for a certain type of situations. Hence, the CBR system will advise the drilling operator on how to react to the current situation based on historical experiences stored in the case base.

The case base contains human experiences covering solutions and advice to a rich set of situations. Cases 40 stored in the case-base represent interesting situations that operators of the monitoring systems need to focus their attention to. Interesting situations are found by inspecting human experience stored in daily drilling reports, best practices and other relevant documents. The advice part 42 and the static data 43 in a case 40 are made (manually by experts) using information stored in document knowledge management systems. The situation description part 41 is automatically generated using actual logs from past drilling operations. From the raw data stored in the logs, interpreted events and processing functions produce their output and the relevant data is put into the case. The manually input and the automatically generated data together comprise the finished case 40.

Each stored case in the case base 34 is stored as an XML-structured file, within a file system or database system. Below is an excerpt from an XML representation of case, taken from the start of the case, i.e. the static data part 44.

```
<?xml version="1.0" encoding="UTF-8" standalone="no" ?>
  - <case name="Case-V12-PackOff-Gullfaks-48A-8.5in-03"
    status="solved">
  - <section name="Administrative Data">
  - <entry parameter="Operator Company" source="Human">
      <symbolValue>OilCo</symbolValue>
    </entry>
  - <entry parameter="Well Identification" source="Human">
      <symbolValue>Well 1402948</symbolValue>
    </entry>
  - <entry parameter="Oil Field Identifier" source="Human">
      <symbolValue>MyField</symbolValue>
    </entry>
  - <entry parameter="Drilling Contractor" source="Human">
      <symbolValue>DrillWell Drilling Company</symbolValue>
    </entry>
  - <entry parameter="Well Type" source="Human">
      <symbolValue>Production Well</symbolValue>
    </entry>
  - <entry parameter="Well Section" source="Human">
      <symbolValue>8.5 Inch Section</symbolValue>
    </entry>
    </section>
  - <section name="Wellbore Formation Characteristic">
  - <entry parameter="Geological Period" expertRelevance="0.2"
      source="DBR">
      <symbolValue>Triassic</symbolValue>
    </entry>
  - <entry parameter="Geological Zonation" expertRelevance="0.5"
      source="Human">
      <symbolValue>Heather Fm</symbolValue>
    </entry>
```

-continued

```
  - <section name="Lithology">
  - <entry parameter="Claystone" expertRelevance="0.5"
    source="Human">
      <symbolValue>True</symbolValue>
    </entry>
  - <entry parameter="Sandstone" expertRelevance="0.5"
    source="Human">
      <symbolValue>True</symbolValue>
    </entry>
  - <entry parameter="Limestone" expertRelevance="0.5"
    source="Human">
      <symbolValue>True</symbolValue>
    </entry>
    </section>
    </section>
  - <section name="Planned Section Data">
  - <section name="Planned Well Geometry Parameter">
  - <entry parameter="Planned Section Depth" source="DBR">
      <dataValue valueType="Double" unit="m">null</dataValue>
```

The system builds up a representation of the current situation, and a representation of a past case, read from the XML file, as the same type of internal data structure in memory. Then the system is ready to match the two cases and assess their similarity.

Referring again to FIG. 2, the similarity between the case 22, in which the current situation is captured, and the situations stored in a case-base 34 is measured by matching 35 the situation description of the current case with the cases stored in the case base 34. Determining the degree of match between two cases is a process of iteratively assessing the similarity between single parameters or group of parameters in the two cases. The matching of parameters can be done through symbolic similarity measures, numeric similarity measures, and various distance metrics. In order to tune the relative impact of each individual parameter in the matching process, each parameter or parameter group is assigned a weight between 0 and 1. A total matching degree for all cases in the case base is computed on the basis of the number of matching parameters and their weights.

The result of the matching process is one or more cases retrieved 36 from the case base. The set of retrieved cases 36 contain those cases for which the total matching degree to the case describing the current situation is above a certain threshold, which is pre-set. The retrieved case or cases is presented to the user by including it in its proper position on the case radar 37 (see FIG. 7).

The ontology 33 can be utilized in the matching process by expanding a single parameter into a set of parameters through synonym relationships, subclass relationships, or other type of relationships. This enables two parameters to match even if they are represented as different terms, and hence are syntactically different, as long as the terms are linked in the ontology via one of the relevant relationships.

Figure 5:
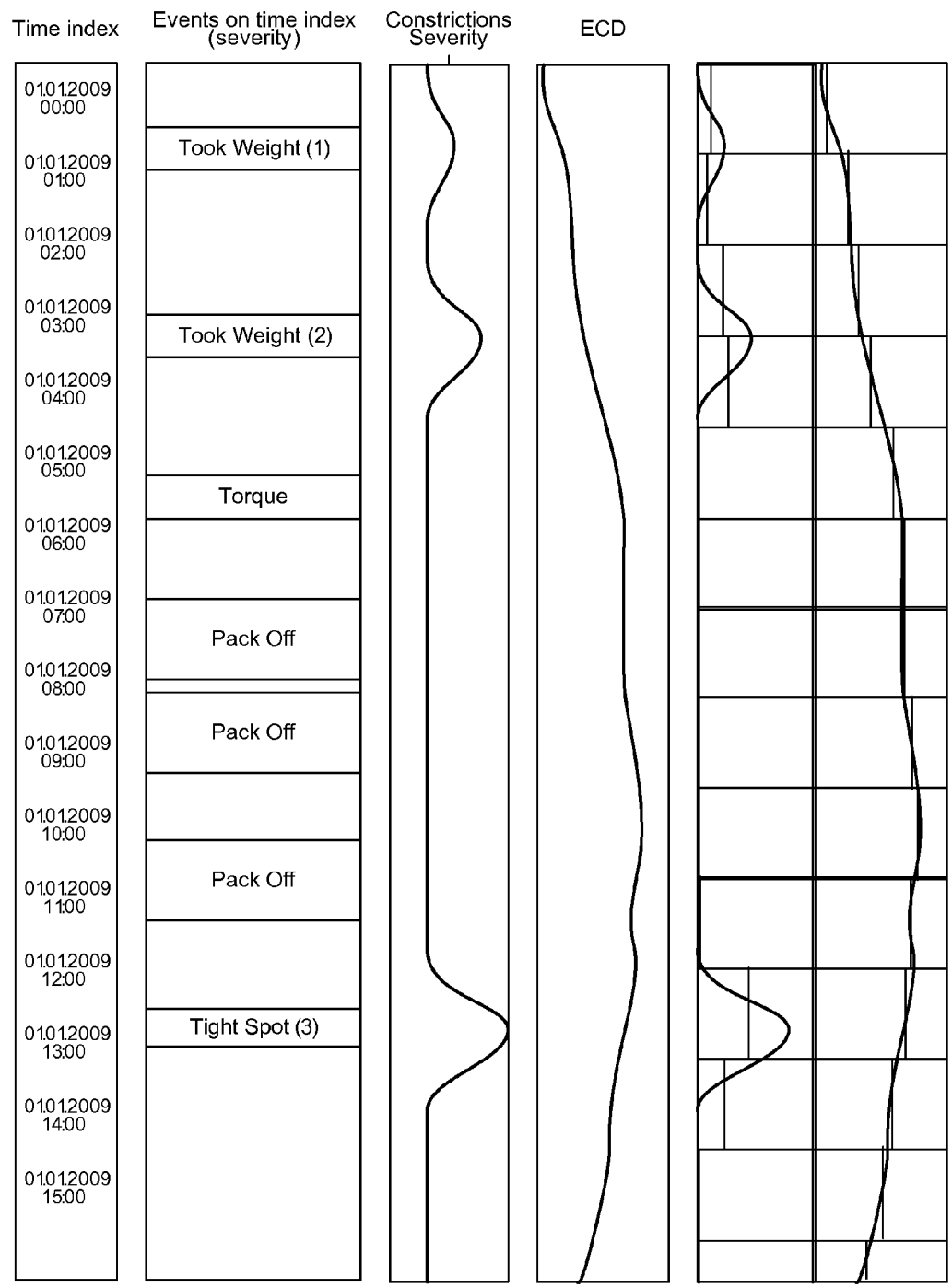
FIGS. 5 and 6 are illustrations of examples of several different forms of dynamic data that are preferably included within the data structure of the case description of FIG. 4; and, FIG. 7 shows an example of a case radar display which plots matching cases according to the degree of similarity and the underlying root cause of the associated problem.

Sequential data can be represented using both symbolic and numerical representations. FIG. 5 illustrates both symbolic and numerical data indexed along a time scale. The leftmost column represents a time scale and the other four columns are indexed along this time scale. A symbolic representation of events is illustrated in the column named Events on time index (severity), where events have both a start time, end time and a number representing the severity. Seven events are detected in the time span illustrated, but for illustrative reasons only the constrictions (took weight and tight spot) have been given severity and color. Three levels of severity are used, where 1 is least and 3 is most severe.

The two next columns, Constrictions severity and ECD, illustrate numeric values along the time scale. The length of the time intervals depends on how often the measurements are done on the rig, current practices ranges from one to twenty seconds. Typically, ECD is part of the real-time data provided during oil drilling while Constrictions severity is a processed indicator. As illustrated in FIG. 5, Constrictions severity, is computed as a normal distribution with mean at the center of the event.

The rightmost column in FIG. 5 is a numerical sequence representation of Constrictions severity and ECD. For a given time interval, numerical values, like Constrictions severity and ECD, are not represented as all the values, but as the mean of all the values in that time interval. The curves are represented as a straight line indicating the mean value of that time interval.

Figure 6:
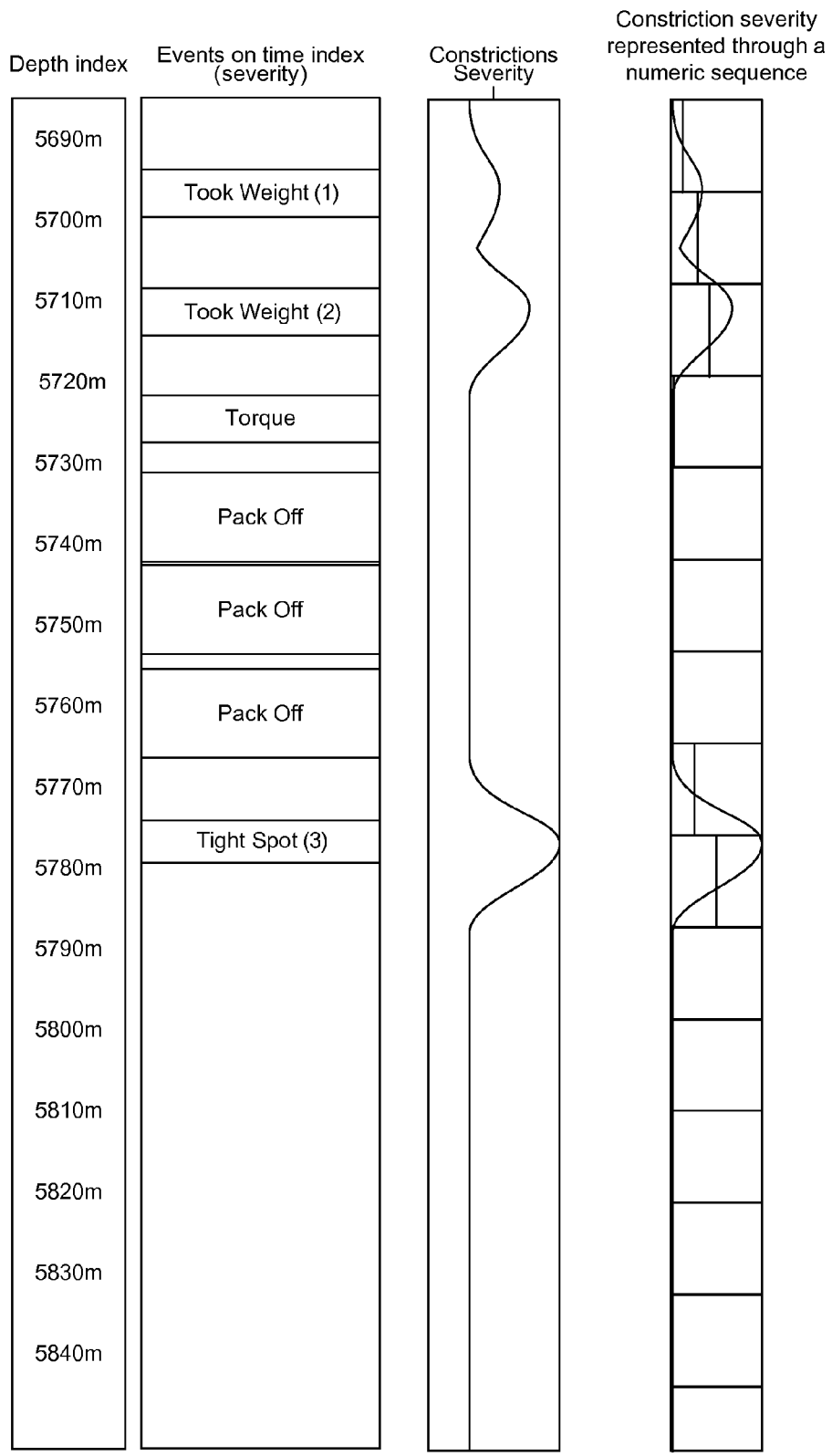

FIG. 6 shows the same sequential data as on FIG. 5, but indexed on depth rather than time. As with the time scale, the second column named Events on depth index (severity) is a symbolic representation of Events, but here they have a start depth and end depth.

FIGS. 5 and 6 show an example where there is almost a one to one correspondence between a given time and a given depth, but this is not always the situation. Every point in time corresponds to a unique depth, given the depth where the drill bit is at that time. However, the drill bit may be at the same depth several times so that there is no unique corresponding time to a given depth.

When matching cases, sequences of events represented as symbols are matched using edit distance. Both distance and difference in severity can be taken into account when measuring the similarity of the sequences. The distance between two sequences is the number of steps needed for transforming one sequence into the other. The penalty for transforming events of the same type with different severity is less than the penalty for transforming events of different types.

A similar approach is used for matching numerical sequences. Each time interval in a sequence is called a sequence section, and two sequence sections can be compared by comparing numerical parameters of the same type (i.e. ECD) against each other using, for instance, a linear metric combining them into a similarity for the sequence section as a whole. Then, an edit distance metric can be used to find out how many transformations are needed in order to transform one of the sequences into the other.

As shown in FIG. 2, the result of the case matching process is an ordered list of retrieved cases 36 and their associated degree of similarity to the input case. Each case in the list has an associated similarity, which is a number between 0 (no similarity) and 1 (total similarity). From this list, all cases with a similarity above some threshold (e.g. 0.7) is shown on a "case radar" 37.

Figure 7:
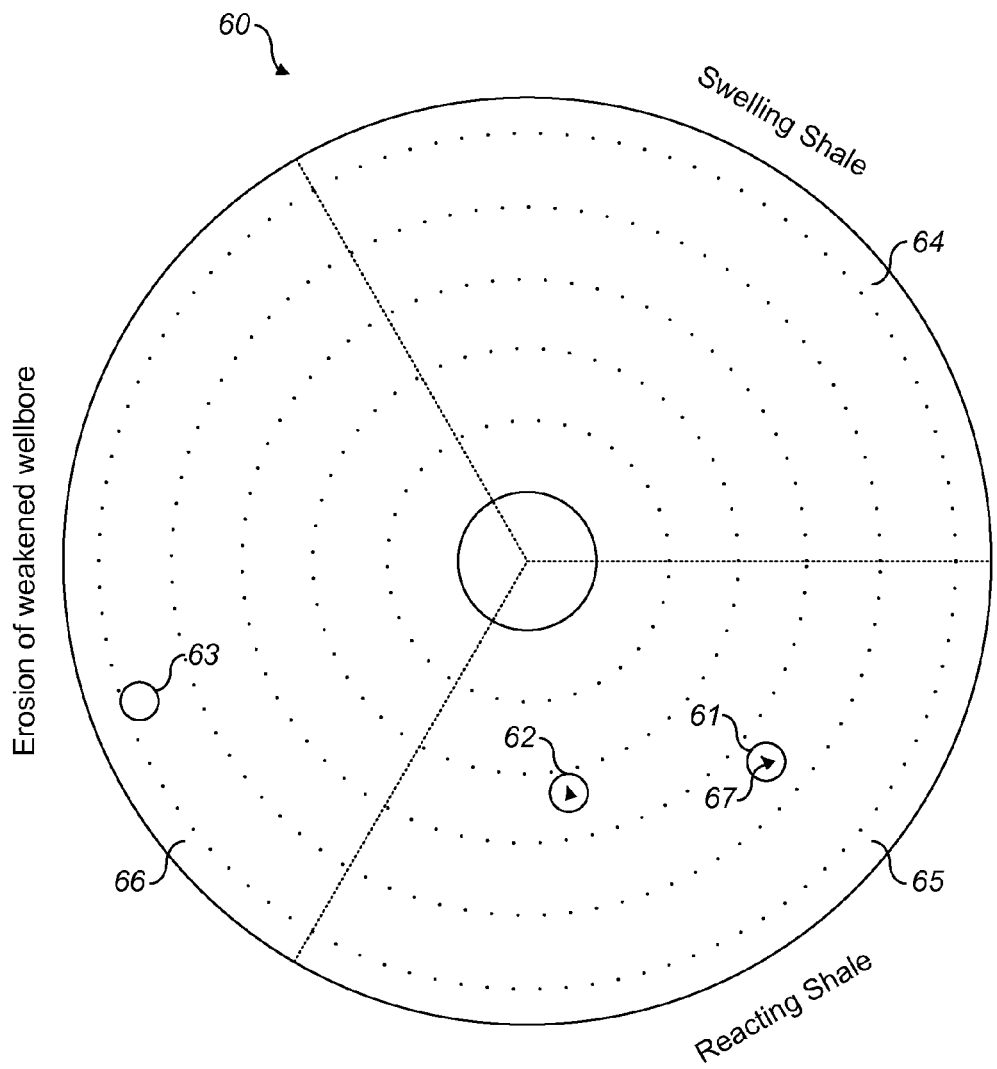

As shown in more detail in FIG. 7, the case radar 60 displays this set of matched cases, with four dimensions of information about each case. A case 61 to 63 is represented as a dot on the radar. The radial position is determined by dividing the radar into sectors 64 to 66 based on some classification of the cases, for instance the root cause of the problem the case represents. Within each sector 64 to 66, the placement of the case is random but consistent, so that the same case will appear from the same radial position each time. The radial displacement from the centre is given by the degree of similarity to the current situation, such that a case with low similarity is closer to the edge of the radar and a case with high similarity is closer to the centre. The colour of the dot can indicate the severity of the situation the case represents. A high-severity situation may be represented as a red dot while a less severe situation is yellow or white, for example.

An arrow 67 inside a dot shows the movement of the case over time. As the matching is performed continuously on real-time data, the situation slowly changes, which also affects the similarity of the retrieved cases. If the current situation develops in such a way that a retrieved case has become more similar, an arrow 67 pointing towards the centre of the radar is shown. If the retrieved case becomes less similar, the arrow 67 points towards the edge. If there is no significant movement, there is no arrow.

The invention claimed is:

1. A computer-implemented method comprising:
   a. computer processing operational data received from a source to identify one or more past cases stored in computer memory in a database that match a current operational situation to a degree of similarity above a predetermined threshold level; and,
   b. displaying the or each matching case as a symbol on a polar plot in which the degree of similarity is represented by the radial displacement from a central point,
   wherein each symbol displayed on the polar plot is linked to an individual past case and can be user-selected to retrieve and display details of the past case.

2. A method according to claim 1, in which each matching case is displayed as a symbol on the polar plot within one of a plurality of sectors, where each sector represents a class of cases.

3. A method according to claim 1, in which each sector represents a class of cases associated with a root cause of a problem the cases represent.

4. A method according to claim 1, in which the received operational data is computer processed to identify one or more events from a set of known events.

5. A computer-implemented method comprising:
   a. receiving a data stream including a plurality of real time logs;
   b. processing the received data stream to generate a computerised situation description including data representing a current situation;
   c. comparing the computerised situation description with a set of past case records stored in computer memory in a knowledge database; and
   d. identifying one or more past case records that match the current situation as defined by the situation description to a degree of similarity above a predetermined threshold level;
   wherein matching cases are displayed as symbols on a polar plot where the degree of similarity varies as a function of radial displacement from a central point.

6. A computer-implemented method according to claim 5, in which each matching case is displayed as a symbol on the polar plot within one of a plurality of sectors, where each sector represents a class of cases.

7. A computer-implemented method according to claim 6, in which each sector represents a class of cases associated with a root cause of a problem the cases represent.

8. A computer-implemented method according to claim 5, in which the received digital data stream is processed to identify one or more events from a set of known events.

9. The computer-implemented method of claim 5, further comprising:
   e. providing a visual display of matching cases identified in step (d) which allows a user to retrieve and view details of the stored past cases.

10. The computer-implemented method of claim 8, further comprising repeating steps (a) to (e) over time, thereby to update the visual display of matching cases.

11. A computer-based system comprising:
- a data analysis server coupled to a communications network for receiving a data stream including a plurality of real time sensor logs associated with an operation; and,
- a database of past case records, each case record including data describing an historic situation, wherein the data analysis server is programmed to:
a. process the received data stream to generate a situation description including data representing a current situation;
b. compare the situation description with the past case records stored in the database; and
c. identify one or more past case records that match the current situation as defined by the situation description to a degree of similarity above a predetermined threshold level;

wherein the data analysis server is further programmed to:
d. generate a visual display of matching cases identified in step (c) which allows a user to retrieve and view details of the stored past cases; and, wherein matching cases are displayed as symbols on a polar plot where the degree of similarity varies as a function of radial displacement from a central point.

12. A computer-based system according to claim 11, wherein steps (a) to (d) are repeated over time, thereby to update the visual display of matching cases.

13. A computer-based system according to claim 11, in which each of the matching cases is displayed as a symbol on the polar plot within one of a plurality of sectors, where each sector represents a class of cases.

14. A computer-based system according to claim 13, in which each sector represents a class of cases associated with a root cause of a problem the cases represent.

15. A computer-based system according to claim 11, in which the received digital data stream is processed to identify one or more events from a set of known events.

\* \* \* \* \*